United States Patent Office 3,623,392
Patented Nov. 30, 1971

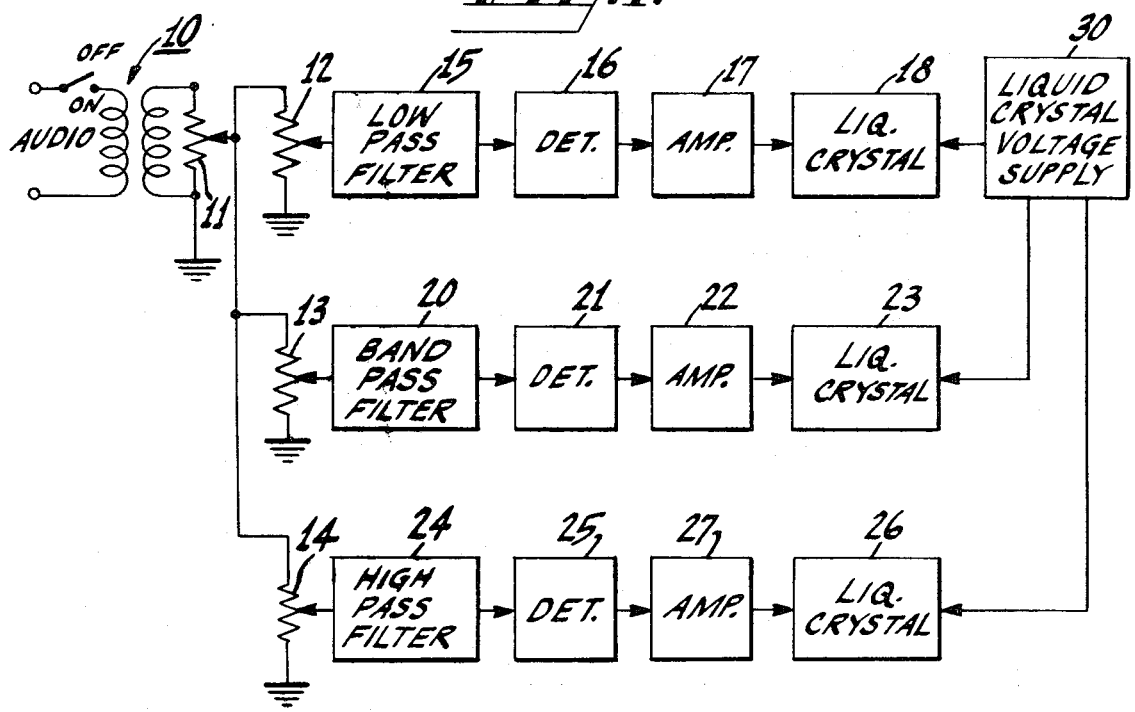
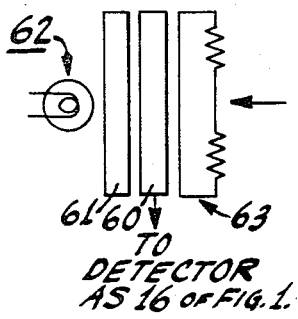
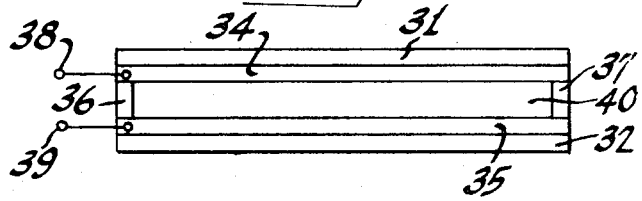
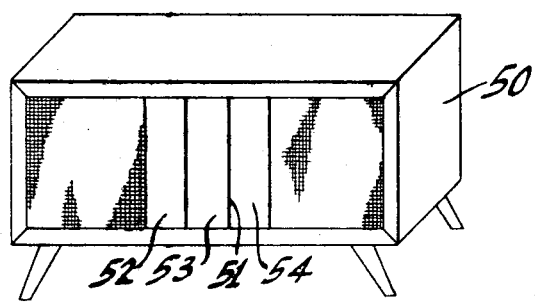

3,623,392
VISUAL DISPLAYS UTILIZING LIQUID CRYSTALS
Lawrence Adolph Boyer, Princeton, N.J., assignor to RCA Corporation
Filed Aug. 19, 1970, Ser. No. 68,168
Int. Cl. A63j 17/00
U.S. Cl. 84—464                 9 Claims

ABSTRACT OF THE DISCLOSURE

There is disclosed a display for the visual portrayal of sound into colored patterns utilizing liquid crystal devices which change color or alter their response to light according to the magnitude of applied control voltages derived from detecting electrical variations proportional to the frequency and intensity of sound.

---

This invention relates to a system for visual portrayal and interpretation of sound into colored patterns.

There exist many systems in the prior art which have been devised for interpreting sound, especially music, in terms of color. The systems proposed utilize banks of colored lamps or lights which are driven by the audio signal and hence have their light intensities modulated according to the sound. These lamps may be selected and controlled in accordance with either the frequency or amplitude characteristics of the sound energy from the reproducer, or both.

In accordance with the prior art, sound from any suitable source is converted into an electric current which is amplified and then separated into distinct bands of frequency by a series of selective filters. The filter currents are used to control the intensity of a plurality of light banks, each bank being of a different color. Presently the use of special visual effects in conjunction with audio reproduction is widely utilized and has been referred to, in many instances, as psychedelic lighting.

Most of the prior art systems are expensive and are relatively large, as they require a plurality of high intensity light sources to produce the desired visual effects. Such light sources dissipate large amounts of power and hence have relatively short lives, while being expensive to maintain and operate.

It is desirable to provide a system for the visual portrayal of sound into a color display which is relatively economical while requiring low power for operation.

In accordance with the invention a system displaying color patterns representative of sound, includes filter means adapted to receive electrical variations derived from the sound system. The filter means serve to separate the variations into a predetermined frequency band. The output of the filter means is coupled to a suitable detecting circuit for producing a control voltage according to the magnitude of said variations within said predetermined frequency band. The control voltage is then applied to a liquid crystal device, which is responsive to the control voltage and exhibits a variation in color according to the magnitude of the applied control voltage.

The operation and orientation of the system will be described if reference is made to the following specification when read in conjunction with the accompanying figures, in which:

FIG. 1 is a schematic diagram partly in block form of a system according to this invention;

FIG. 2 is a cross-sectional view of a typical liquid crystal device utilized according to this invention;

FIG. 3 is a plan view of an audio reproducing equipment incorporating a display panel according to this invention;

FIG. 4 is an alternate embodiment of a display system according to this invention.

Referring to FIG. 1, numeral 10 refers to an audio transformer 10 having a primary winding to which is applied a suitable audio signal. Such a signal may be that signal derived from the audio amplifier of a typical phonograph, radio receiver, tape recorder, and so on. Such apparatus for producing an audio signal in response to a transmitted program or in accordance with a prerecorded format are well known. The secondary winding of the transformer 10 is shunted by a potentiometer 11 which has a variable arm coupled to an input terminal of potentiometers 12, 13 and 14. The potentiometers 12, 13 and 14 are used as gain control, for three channels, each representative of a particular frequency band encompassed within the frequency band of the audio signals. Potentiometer 11 serves as a master gain control for the system, while each individual potentiometer 12, 13 and 14 serves as a gain control for the particular channel of concern.

The variable arm of potentiometer 12 is coupled to an input of a low pass filter circuit 15 which may be of a conventional type and, for example, may pass the audio frequencies from 50 Hz. to about 200 Hz. These numbers are merely representative of one particular band or range and any other range could be selected as well. The output of the low pass filter 15 is then applied to a detector circuit 16, which may include a semiconductor or other unidirectional conducting device in conjunction with a suitable capacitor and a resistor network. The function of the detector circuit 16 is to convert the electrical variations representative of the audio selected by the low pass filter 15 into a suitable detected voltage having a magnitude proportional to the magnitude of the audio signals transmitted via filter 15. The output of the detector 16 is coupled to an amplifier device 17 which may be an emitter follower or other suitable isolating amplifier configuration. The output of the amplifier 17 is applied to one terminal of a liquid crystal device 18, which, as will be explained subsequently, will alter its response to light and hence exhibit a variation in the effective color according to the magnitude of the control voltage applied thereto.

Similarly, a mid-band channel is derived by coupling the variable arm of potentiometer 13 to a bandpass filter 20 which, for example, may pass the audio frequencies from 500 Hz. to 1000 Hz. The output of the bandpass filter 20 is coupled to a detector circuit 21 which serves to produce a control voltage proportional to the amplitude of the mid-band audio frequencies transmitted via filter 20. The output of the detector 21 is coupled to an amplifier device 22 which operates similar to amplifier 17 described above. The output of the amplifier 22 is coupled to a liquid crystal 23, which also serves to vary its color or alter its response to light in accordance with the applied control voltage.

The high pass channel includes the high pass filter 24 having its output coupled to a detector 25 which serves to drive the liquid crystal 26 via the amplifier 27. It is also noted that each liquid crystal 18, 23 and 26 is coupled to a liquid crystal voltage supply 30 which may be a relatively low power, low frequency oscillator, and as such is utilized to apply suitable operating potentials to the above-noted liquid crystals devices. The oscillator 30 can operate at about 60 Hz. with about a 50 volt amplitude.

Referring to FIG. 2, there is shown a cross-sectional view of a liquid crystal which may be utilized for the liquid crystals 18, 23 and 26 shown in FIG. 1.

The liquid crystal cell or device has the characteristics of a parallel plate capacitor with the liquid crystal material forming the dielectric. Essentially, the basic liquid crystal cell appears as a sandwich configuration and has a top plate 31 which may be fabricated from a relatively thin piece of glass. A bottom plate 32 is also fabricated from glass and is usually of the same thickness as the top plate 31. The inside surfaces of the glass plates 31 and 32 are then coated with a suitable conductive material such as tin oxide, which as shown comprises layers 34 and 35, respectively. The layers 31 and 34 are separated from the layers 32 and 35 by means of suitable spacing elements 36 and 37, which are generally polymeric spacers such as Teflon. The spacers 36 and 37 serve to keep the thickness of the active area within a range from 6 to 25 microns. Electrodes 38 and 39, which are attached to the tin oxide layers 34 and 35, are used to apply suitable operating voltages thereto. The space between the above-noted layers is filled with a liquid crystalline compound 40, whose nature and operation will be briefly described. For suitable materials and compounds, see an article entitled "Liquid Crystal Display Devices" by George H. Heilmeier, printed in Scientific American, vol. 222, April 1970.

As indicated, the liquid crystal cell has the characteristics of a parallel plate capacitor, with the liquid crystal material 40 forming the dielectric. With zero voltage applied to the electrodes 38 and 39, material 40 is quiescent and essentially transparent. Upon the application of a D.C. or low frequency signal to the plates via the electrodes 38 and 39, the liquid crystal material 40 turns opaque or translucent. The magnitudes of the applied voltages are usually on the order of about $5 \times 10^3$ volts per centimeter. The opaqueness is not a chemical reaction, but under the influence of the electrical field, the liquid crystalline material becomes turbulent and scatters light. When the field is removed, the liquid crystal returns to its original transparent condition. This optoelectrical switching property has recently been referred to as dynamic scattering. Briefly, dynamic scattering is a condition which occurs in special groups of materials in a class of liquid crystals referred to as nematic. Nematic molecules are long and are of cylindrical shape. Because of this arrangement, the molecules cannot align with their dipole moment when an electric field is applied to a thin film of this material. Instead, the axes of the molecules remain at some angle with respect to the electric field. This off-axis alignment of the molecular axis and electric field produces the scattering mode which causes discontinuities in the molecular distribution serving to represent a change in the index of refraction. The liquid crystal can be utilized in two ways. One is a transmissive mode and the other a reflective mode. The transmissive mode operates as follows. Assume a light source is placed behind the liquid crystal and that a viewer is in front of the liquid crystal. In this case, with no applied voltage to the crystal, the viewer would see the light as the light would be transmitted through the crystal. As soon as the voltage is applied to the electrodes, the liquid crystal material turns opaque, thus blocking much of the light from the viewer.

In the reflective mode one of the layers of the glass as 31 may be replaced by a chromium or aluminum reflector. Therefore, with no voltage applied to the crystal, light transmitted through the liquid crystal material 40 is reflected from the reflecting surface 31 and viewed by a viewer. With voltage applied to the electrodes, the liquid crystal material turns opaque, thus preventing light from being reflected and hence reducing the effective brightness. In addition to the above-described modes of operation, liquid crystals properly treated can also serve to change color upon the application thereto of an electric field. Color operation is provided by using dyes which are mixed with the materials forming the nematic cells. Such cells can use pleochroic dyes which exhibit a different absorption spectrum to light. If a liquid crystal fabricated with these materials is illuminated with light, it produces a reversible conversion from one form to another. This changes the absorption spectra of the cell and hence the color.

The use of the liquid crystal in the system shown in FIG. 1 eliminates the need for high power and high dissipation light devices while requiring small space. Basically, as indicated in FIG. 2, a liquid crystal is a simple structure consisting of the two parallel glass plates with the drop of liquid crystal material sandwiched between them. Hence, the thickness of a liquid crystal element is about the same as that of a conventional window pane of glass.

Referring to FIG. 3, there is shown a representative console 50 which may contain suitable audio reproducing equipment which as a radio receiver, phonograh, tape recorder, and so on. The console 50 contains on a front panel, a display 51 which is a multi-liquid crystal display having three sections 52, 53 and 54. The display sections may be the liquid crystal devices shown in FIG. 1 as 18, 23 and 26. It can be seen that the system of FIG. 1, when used in the environment shown in FIG. 3, would cause each of the display panel sections 52, 53 and 54 to change color according to the intensity of the particular frequency band selected by the apparatus shown in FIG. 1. Hence, a manufacturer can provide a typical audio reproducing equipment arranged in a console while including the circuitry described in FIG. 1 to formulate a panel similar to that shown in FIG. 3. This gives the consumer both audio reproduction with the inherent visual portrayal and interpretation of sound in colored patterns.

Referring to FIG. 4, there is shown a cross section of another means of producing a varying color display using a liquid crystal 60. Liquid crystal 60 upon the application of a suitable control voltage from a detector circuit as 16, 21 or 25 of FIG. 1 will turn transparent and opaque in degrees according to the intensity of the control voltage. The liquid crystal 60 is located in front of a color filter 61 which is placed in front of a relatively small light source 62. In front of the liquid crystal 60 one may place a suitable plastic filter 63 for producing a particular pattern to further scatter light according to aesthetic considerations. Such plastic filters as 63 are well known in the art, and as shown on the drawing may have roughened surfaces to produce unique visual effects. Briefly, if the display is viewed in the direction of the arrow shown in FIG. 4 and the liquid crystal 60 is in its quiescent state, the light 62, being energized, will be seen through the liquid crystal at the particular color selected for the filter 61. As soon as the control voltage causes the liquid crystal 60 to turn opaque, the light will no longer be seen. If the control voltage is applied as shown in FIG. 1, the light seen will be modulated according to the audio signal. Hence, the viewer will see light proportional to the frequencies of the audio signal being reproduced. It is seen that by using the liquid crystal device in the particular environment described above, one can provide the consumer with a psychedelic display which may be fabricated as a part of the particular console containing the audio equipment without substantially increasing the power requirements of the system and without increasing size of the console.

A single source, as 62, can also be utilized as the illuminating means for a plurality of liquid crystal panels, such as those, for example, shown in FIG. 3 as 52, 53 and 54.

What is claimed is:

1. A system for displaying colored patterns representative of sound which has been converted into electrical variations, comprising, in combination:
    (a) filter means adapted to receive said electrical variations to separate said variations into a predetermined frequency band;
    (b) first means coupled to said filter means for producing at an output terminal a control voltage according to the magnitude of said variations within said predetermined frequency band;
    (c) at least one liquid crystal device having an input terminal coupled to said output terminal of said first means and responsive to said control voltage for varying the response of said crystal to light, whereby when said crystal is viewed its color will be altered.

2. A system for displaying colored patterns representative of sound which has been converted into electrical variations, comprising, in combination:
   (a) a low pass filter, a high pass filter, and a bandpass filter, each of said filters adapted to receive and separate said variations into a plurality of different frequency bands;
   (b) first means coupled to said filters for detecting the envelopes of said frequency bands to provide first, second and third control signals;
   (c) a plurality of liquid crystal devices, each having an input terminal, said liquid crystals being adapted to alter their response to light according to the magnitude of a voltage applied to said input terminal;
   (d) means coupling said first means to said liquid crystals, for energizing one of said crystals according to said first control signal, a second of said crystals according to said second control signal and a third crystal according to said third control signal.

3. The system according to claim 2 wherein said liquid crystals are of the type whereby said applied voltage causes the opaqueness of said crystal to vary accordingly.

4. The system according to claim 2 wherein said liquid crystals are of the type whereby said applied voltage causes the reflective qualities to vary accordingly.

5. The system according to claim 2 wherein said liquid crystals are of the type whereby said applied voltage causes the color of said crystal to change accordingly.

6. Apparatus for use as a display in audio processing equipment such as phonographs, radios, and so on, for providing a colored display according to sound which has been converted into electrical variations, comprising, in combination;
   (a) a plurality of filters, each one adapted to receive and separate said variations into a plurality of different frequency bands;
   (b) a plurality of detection circuits, each one coupled to a different one of said filters, for detecting one of said different frequency bands to provide a control voltage of a magnitude proportional to the intensity of said variations;
   (c) a plurality of liquid crystal devices, each having an input terminal for application thereto of a voltage, said liquid crystals being adapted to alter their color in accordance with the magnitude of said voltage; and
   (d) means coupling each input terminal of said liquid crystals to a separate and different one of said detection circuits to cause said crystal color to vary according to said control voltage.

7. The apparatus according to claim 6 wherein said plurality of liquid crystals are mounted on the front panel of said audio processing circuitry.

8. The apparatus according to claim 6 wherein said plurality of filters include a low pass filter, a high pass filter, and a bandpass filter.

9. The apparatus according to claim 6 further comprising:
   (a) an oscillator circuit having an output coupled to each of said liquid crystals for providing a biasing for said crystals which, in conjunction with said control voltage, causes said crystals to change their color.

References Cited
UNITED STATES PATENTS
| | | | |
|---|---|---|---|
| 2,810,883 | 10/1957 | Carnine | 84—464 UX |
| 3,215,022 | 11/1965 | Orgo | 84—464 |
| 3,322,485 | 5/1967 | Williams | 58—50 UX |

FOREIGN PATENTS
| | | | |
|---|---|---|---|
| 719,560 | 1954 | Great Britain | 84—464 |

RICHARD B. WILKINSON, Primary Examiner

J. F. GONZALES, Assistant Examiner

UNITED STATES PATENT OFFICE
CERTIFICATE OF CORRECTION

Patent No. 3,623,392          Dated November 30, 1971

Inventor(s) Lawrence Adolph Boyer

It is certified that error appears in the above-identified patent and that said Letters Patent are hereby corrected as shown below:

Column 1, line 7, that portion reading "Ser. No. 68,168" should read -- Ser. No. 65,168 --.
Column 4, line 12, that portion reading "phonograh" should read -- phonograph -- .

Signed and sealed this 11th day of July 1972.

(SEAL)
Attest:

EDWARD M. FLETCHER, JR.
Attesting Officer

ROBERT GOTTSCHALK
Commissioner of Patents